United States Patent [19]

Alvarado et al.

[11] Patent Number: 5,569,006
[45] Date of Patent: Oct. 29, 1996

[54] BULB FASTENER

[75] Inventors: Edmundo Alvarado, Huntington Park; Soheil A. Eshraghi, Irvine; Su Q. Tran, Santa Ana, all of Calif.

[73] Assignee: Textron, Inc., Providence, R.I.

[21] Appl. No.: 438,957

[22] Filed: May 11, 1995

[51] Int. Cl.⁶ .......................... F16B 13/04; F16B 13/06
[52] U.S. Cl. .................................. 411/43; 411/70
[58] Field of Search ................... 411/39, 40, 41, 411/43, 69, 70

[56] References Cited

U.S. PATENT DOCUMENTS

| | | |
|---|---|---|
| 3,148,578 | 9/1964 | Gapp . |
| 3,292,482 | 12/1966 | Fry et al. . |
| 3,302,510 | 2/1967 | Gapp . |
| 3,369,289 | 2/1968 | Gapp . |
| 3,390,601 | 7/1968 | Summerlin . |
| 4,012,984 | 3/1977 | Matuschek . |
| 4,143,580 | 3/1979 | Luhm . |
| 4,388,031 | 6/1983 | Rodgers . |
| 5,052,870 | 10/1991 | Pratt et al. . |
| 5,131,107 | 7/1992 | Pratt et al. ........................ 411/43 X |
| 5,141,373 | 8/1992 | Kendall . |
| 5,252,014 | 10/1993 | Andrews ................................ 411/43 |
| 5,429,464 | 7/1995 | Eshraghi ............................... 411/43 |

FOREIGN PATENT DOCUMENTS 472329  9/1937  United Kingdom .

Primary Examiner—Neill R. Wilson
Attorney, Agent, or Firm—Knobbe, Martens, Olson & Bear

[57] ABSTRACT

A fastener including a sleeve, a stem extending through the sleeve, an integral shear ring adjacent a tail end of the sleeve, and an expander ring between the shear ring and the sleeve tail to facilitate bulbing of the sleeve tail.

4 Claims, 1 Drawing Sheet

BULB FASTENER

FIELD OF THE INVENTION

The present invention relates generally to blind fasteners, wherein a blind end of a fastener sleeve is bulbed outwardly to clamp workpieces together and secure one end of the fastener.

BACKGROUND OF THE INVENTION

Blind fasteners, or rivets, as well known in the art, are utilized in fastening components in which only one side of a workpiece is accessible. U.S. Pat. No. 3,148,578 to Gapp describes a fastener including a tubular fastener body or sleeve with an elongated stem extending through the sleeve. One end of the stem is adapted to be gripped and pulled by a pulling tool while the opposite end has an upsetting head. Adjacent a tail end of the sleeve is a shear ring integrally formed with the stem.

In operation, the Gapp assembly is inserted through aligned holes in workpieces to be secured together. A tool is used to pull the upsetting head of the stem axially into the tail of the sleeve, while a reactionary force is applied against a head of the sleeve. During this first part of the pulling operation, the shear ring engages the sleeve tail which causes radial expansion of the tail and bulbing on the blind side of the workpieces. The shear ring is constructed to shear from the stem at a predetermined tension in the stem, thereby limiting the amount of clamping compression on the workpiece to a predetermined value. Continued pulling causes a lock ring groove in the stem to reach the sleeve head where the lock ring is deformed into the groove. Continued pulling increases the load, causing the stem extending beyond the accessible face of the workpiece to break away.

U.S. Pat. No. 4,012,984 —Matuschek—discloses a design similar to that in the Gapp patent with the addition of a lock ring surrounding the stem and moving with the stem into the sleeve head area.

In other patents such as U.S. Pat. No. 5,052,870—Pratt, et al., a separate shear ring anchored in a groove in the stem is employed instead of an integral shear ring as in the Gapp and Matuschek patents. Also, to ensure that the workpiece plates are drawn together before the sleeve is expanded to fill the hole, the shear ring is provided with an axially tapered forward surface which mates with an inwardly tapered surface on the tail of the sleeve. This facilitates the bulbing of the sleeve tail and ensures good workpiece clamp-up. While there are a number of advantages to the arrangement described in U.S. Pat. No. 5,052,870, the integral shear ring fastener of the Gapp and Matuschek patents also has some advantages and has been used in very successful fasteners.

One disadvantage of the integral shear ring fastener is that the shear ring can cause axial compression, and hence radial expansion of the sleeve before the workpieces have been fully clamped together. The forward end of an integral shear ring may be tapered to mate with a tapered sleeve end as in U.S. Pat. No. 5,052,870 and thus ensure good workpiece clamp-up. This, however, presents some manufacturing limitations and difficulties in that it is necessary that the axial width of the shear ring be precisely controlled so that it will shear with the desired load. If the forward end of the shear ring is tapered with its small diameter towards the sleeve head end and its larger diameter away from the sleeve head, it is necessary to taper the back face of the shear ring in a similar manner in order to control the axial width of the shear ring. This undercut type machining operation is somewhat difficult and expensive. It also largely precludes the use of stamping or coining operations to form the integral shear ring. A need exists for an improved integral shear ring type fastener that will provide the desired workpiece clamp up but will, nevertheless, have simplified manufacturing fabrication techniques.

SUMMARY OF THE INVENTION

Briefly stated, the invention provides an improved fastener having a tubular sleeve and an elongated stem extending through the sleeve with the blind end of the stem having an integral shear ring with its axial faces extending generally perpendicular to the axis of the stem. Such a stem with that simplified form of the shear ring can be readily fabricated with sufficient accuracy to control the desired force needed to shear the ring. To expand the tail of the sleeve to obtain good clamp up of workpiece plates, an expander ring separate from the stem is positioned around the stem between the integral shear ring and the tail of the sleeve. The forward face of the expander ring is tapered.

With that arrangement, the initial pulling of the stem to set the fastener causes the expander ring to be moved by the shear ring into engagement with the sleeve tail, which in turn causes the sleeve tail to be expanded by the expander ring. Thus, the first step of the operation is that the workpiece plates are drawn into engagement. Continued pulling on the stem causes the expander ring, as moved by the shear ring, to radially expand the sleeve and clamp the workpieces together. Continued pulling on the stem eventually causes the shear ring to shear, leaving the shear ring and expander in position while the stem continues to advance through the sleeve. A separate means is provided to stop the stem movement and fracture the pulling end of the stem.

Thus, as noted, one of the advantages of the fastener of the invention is that an integral shear ring may be utilized to simplify manufacturing steps. Further, the desired material for the stem can be selected without concern for the bulbing of the sleeve. Instead, the expander ring may be provided with the desired shape and material to properly bulb the sleeve.

DETAILED DESCRIPTION OF THE INVENTION

Figure 1:
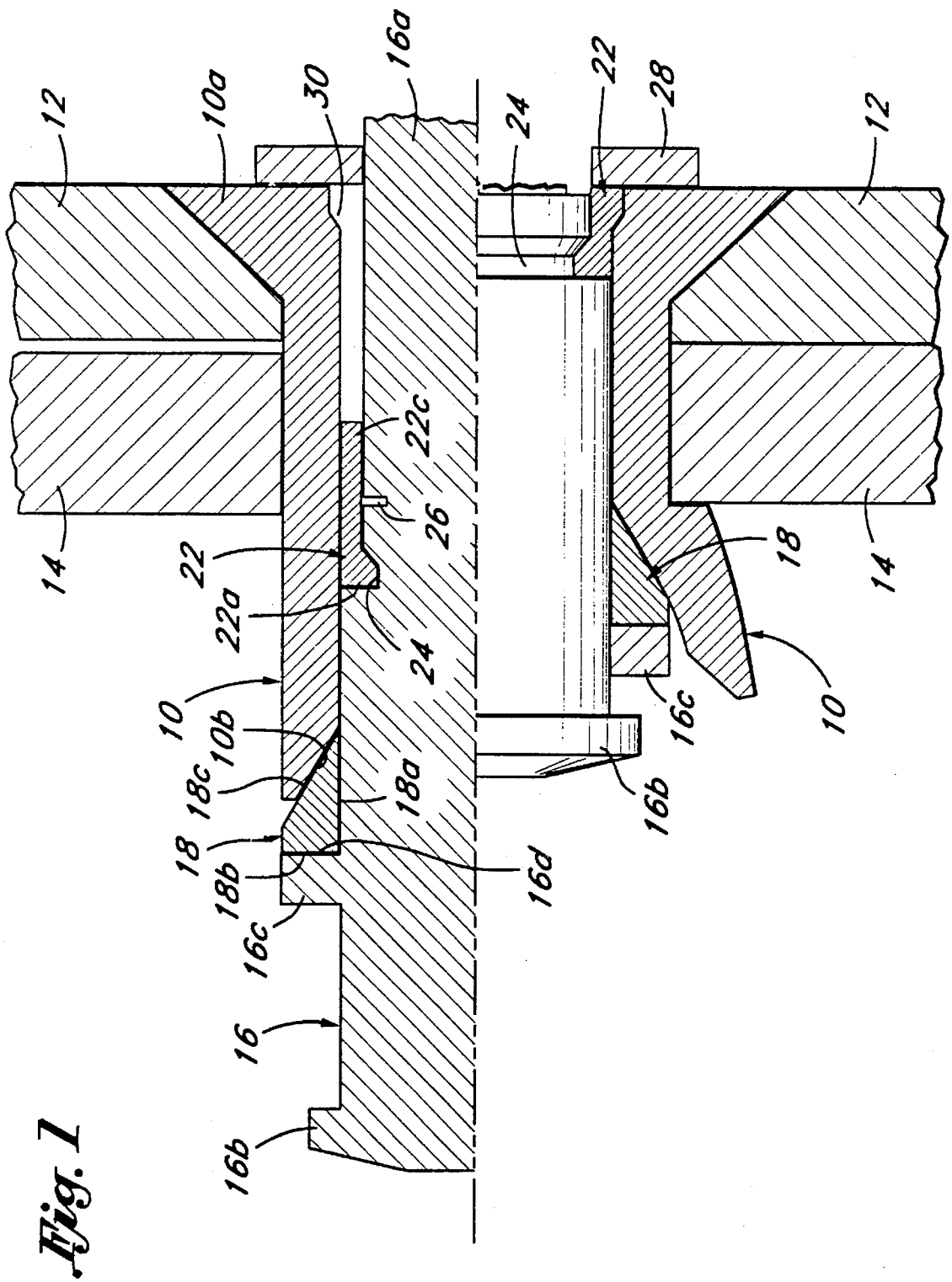
FIG. 1 is a schematic, partially sectionalized view illustrating the fastener of the invention with the fastener installed in the workpiece, with the left half showing the fastener before it is set and the right half showing the fastener after it is set.

As seen in the left half of FIG. 1, a tubular fastener body or sleeve 10 is shown extending through a pair of workpiece sheets 12 and 14. The sleeve has an enlarged head 10a on one end and a tapered end face 10b on a sleeve tail. The tapered end face may be seen to taper outwardly from a smaller diameter axially toward the sleeve head end to a larger diameter axially away from the head. An elongated fastener stem 16 extending through the sleeve has a forward or pulling end 16a provided with conventional serrations (not shown) to assist in the pulling operation. The stem further has an enlarged head 16b protruding beyond the tail of the sleeve. Spaced forwardly from the stem head 16b is a shear ring 16c formed integral with the stem. As can be seen, the shear ring extends generally radially outwardly, generally perpendicular to the longitudinal axis of the step.

The ring has an outer diameter greater than the inner diameter of the sleeve tail.

Positioned between the shear ring 16c and the tapered end 10b of the sleeve is an expander ring 18 which is separate from the stem 16. The expander ring 18 has an inner surface 18a which mates closely with the stem in the area immediately forward of the shear ring. The expander ring also has a rearwardly facing radially extending rear surface 18b, which engages a forward surface 16d of the shear ring 16c. A tapered forward surface 18c on the expander ring faces the sleeve end. In the arrangement shown, the surface 18c engages the rearwardly facing surface 10b of the sleeve. The expander ring 18 may be a complete ring which is positioned on the stem before the stem is inserted in the sleeve; or the expander ring may be formed of material which can be wrapped on the stem into the position shown. One of the advantages of the arrangement is that the expander ring can be made of a material different from the stem to best perform its function. This, in turn, enables the stem to be made of desired material consistent with its functions without concern for the shear ring engaging the sleeve. In a preferred form of the invention the expander ring is made of aluminum.

Positioned forwardly from the expander ring 18 and located within the sleeve is a lock ring 22 having an anchor portion 22a fitting within a lock ring groove 24 in the stem 16. A forward portion 22c of the lock ring surrounds a conventional break groove 26 in the stem which has a diameter slightly smaller than the lock ring groove 24.

In operation, the fastener stem is pulled by a suitable tool in conventional fashion causing the expander ring 18 to be drawn forwardly by the shear ring 16 into the sleeve tail 10b so as to cause the sleeve tail to bulge outwardly, as illustrated in the right half of FIG. 1. Note that the workpiece sheets 12 and 14 have been drawn into tight engagement by this action. When a desired compressive load has been applied to the workpiece plates, the shear ring will shear from the stem permitting the stem to be moved further forwardly, as shown. After the shear ring shears, the lock ring has been engaged by the nose 28 of the pulling tool to cause the lock ring 22 to be deformed into a recess 30 in the head end of the sleeve. Continued pulling causes the stem tail 16a to break at the groove 26, completing the setting of the fastener.

What is claimed is:

1. A blind fastener comprising:

a tubular fastener sleeve having a head and a tail, the sleeve being adapted for insertion through aligned holes in a plurality of workpieces;

an elongated stem extending through said sleeve having a shear ring formed integral with the stem spaced rearwardly from the sleeve tail, said shear ring extending generally radially outwardly and having an outer diameter larger than an inner diameter of the sleeve tail; and an expander ring formed separate from the stem positioned around the stem and between a forward surface of the shear ring and a rear surface of the sleeve tail, said expander ring being formed to facilitate expansion of the sleeve tail as the shear ring is drawn towards the sleeve when "setting" the fastener with respect to the workpieces.

2. The fastener of claim 1, wherein the sleeve tail has a rear surface that tapers from a smaller inner diameter to a larger outer diameter rearward of the smaller diameter, and said expander ring has a forward face which tapers rearwardly from a smaller forward diameter to a larger outer diameter rearward of the ring forward diameter.

3. The fastener of claim 1, wherein said shear ring is dimensioned to shear from the stem under a predetermined load after the tail of the sleeve has been bulbed outwardly.

4. The fastener of claim 3, wherein said stem includes a groove adapted to break under a predetermined tension on the stem, and said shear ring will shear under a tension load less than that to break the stem at said break groove.

* * * * *